J. W. DALMAN.
YOKE FOR DRAFT RIGGING AND PROCESS OF MAKING THE SAME.
APPLICATION FILED JULY 8, 1918.

1,307,083.

Patented June 17, 1919.
4 SHEETS—SHEET 1.

INVENTOR
John W. Dalman
BY
Walter A. Scott
ATTORNEY

J. W. DALMAN.
YOKE FOR DRAFT RIGGING AND PROCESS OF MAKING THE SAME.
APPLICATION FILED JULY 8, 1918.

1,307,083.

Patented June 17, 1919.
4 SHEETS—SHEET 2.

INVENTOR
John W. Dalman
BY
Walter A. Scott
ATTORNEY

J. W. DALMAN.
YOKE FOR DRAFT RIGGING AND PROCESS OF MAKING THE SAME.
APPLICATION FILED JULY 8, 1918.

1,307,083.

Patented June 17, 1919.

INVENTOR
John W. Dalman
BY
Walter A. Scott
ATTORNEY

J. W. DALMAN.
YOKE FOR DRAFT RIGGING AND PROCESS OF MAKING THE SAME.
APPLICATION FILED JULY 8, 1918.

1,307,083.

Patented June 17, 1919.
4 SHEETS—SHEET 4.

INVENTOR
John W Dalman
BY
ATTORNEY

UNITED STATES PATENT OFFICE.

JOHN W. DALMAN, OF CHICAGO, ILLINOIS.

YOKE FOR DRAFT-RIGGING AND PROCESS OF MAKING THE SAME.

1,307,083.   Specification of Letters Patent.   Patented June 17, 1919.

Application filed July 8, 1918. Serial No. 243,802.

*To all whom it may concern:*

Be it known that I, JOHN W. DALMAN, a citizen of the United States, residing at Chicago, in the county of Cook and State of Illinois, have invented certain new and useful Improvements in Yokes for Draft-Rigging and Processes of Making the Same, of which the following is a specification.

The object of my invention is to provide an improved and superior yoke for the draft rigging of railway cars, together with a process of making the same. At present draft rigging yokes are constructed almost altogether of cast steel notwithstanding the superior reliability of forged metal. One of the reasons for the use of cast steel is the fact that the castings can be made of such form and with such disposition of the metal as to obtain the necessary cross-section for strength at all parts of the yoke without waste of material caused by using superfluous metal at any point. These yokes are constructed of cast steel in the form known as a hooded yoke, the end parts of the yoke being turned at right angles to the central part which embraces the draft rigging, the turned sections forming a hood which embraces the end of the draw-bar and is secured thereto by means of a key. In designing these yokes a substantially uniform cross-sectional area is given to the structure from end to end, thereby imparting the necessary strength without waste of material. Despite the advantages arising from the fact that cast steel yokes can be made of uniform strength and cross-sectional area throughout, thus obviating waste, there are some few instances in which railroad officials demand forged steel yokes on account of the greater reliability of forged metal. While a perfect steel casting gives satisfactory service there is no means of absolutely insuring the absence of flaws in castings, while properly made forgings are as nearly absolutely reliable as any metal structure can be.

I have found it possible to form forged steel yokes of substantially uniform section from end to end and to make such yokes of the preferred hooded form wherein a key is employed instead of rivets to attach the yoke to the draw-bar.

The nature of my invention will clearly appear from the following descriptions and claims taken in connection with the accompanying drawings forming part of this application, in which drawings, Figure 1 is a plan view of a yoke constructed according to my invention.

Figure 9:
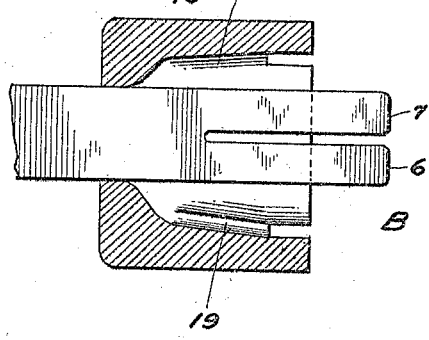
Figure 10:
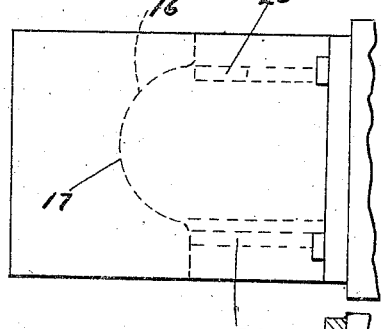
Figure 11:
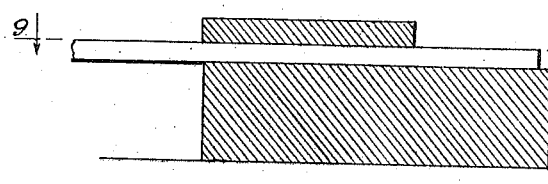
Figure 12:
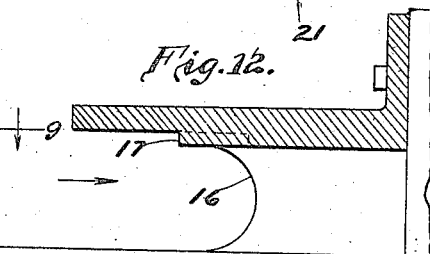
Figure 13:
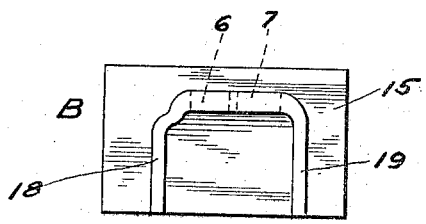
Figure 14:
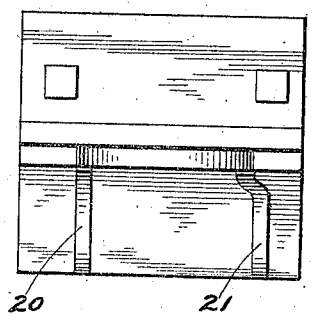

In Figs. 9 to 14 I have illustrated a modified method of forming the hooded end of the yoke. Fig. 9 shows the blank in position in a female die shown in section, and Fig. 10 shows the coacting male die, these two dies being designed to impart the requisite form to the end of the yoke in one operation. Figs. 11 and 12 are longitudinal sectional views of the dies shown in Figs. 9 and 10 with the blank is place. Fig. 13 is an end view of the die shown in Fig. 9 and Fig. 14 is an end view of the die shown in Fig. 10.

Figure 15:
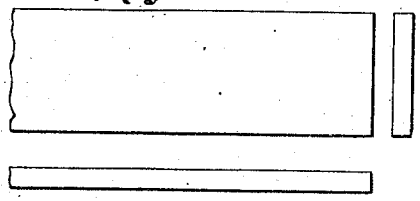
Figure 16:
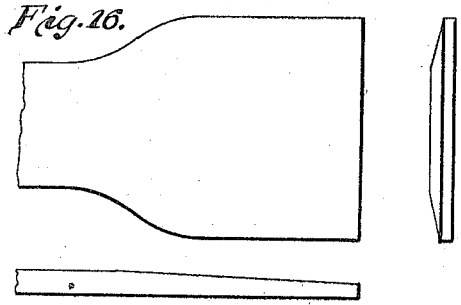
Figure 17:
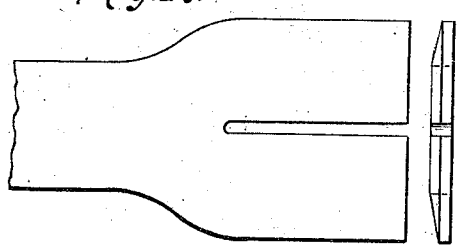
Figure 18:
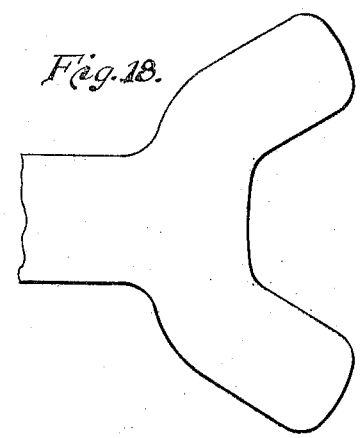
Figure 19:
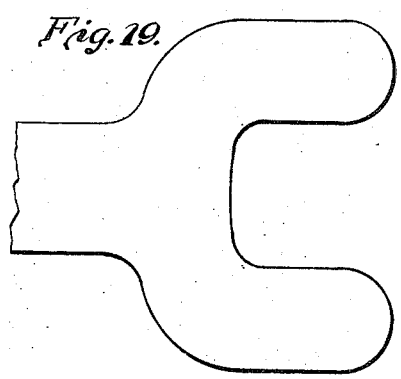
Figure 20:
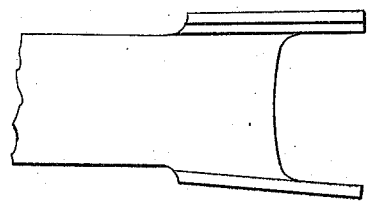
Figure 21:
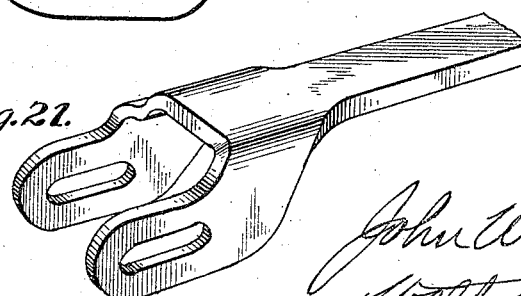

In Figs. 15 to 21 I present a series of views showing another modification of the method of forming the ends of the yoke. Fig. 15 is a top, side and end view of the original blank of forged steel. Fig. 16 is a top, side and end view of the blank after the end has been widened by pressure. Fig. 17 shows the next stage and exhibits the blank cut inwardly from the end to form the sections designed to constitute the parts of the hood at one end of the yoke. Fig. 18 shows the bifurcated ends of the blank spread outwardly, this being the next stage. Fig. 19 shows the bifurcated end sections after being brought back into substantial parallelism. Fig. 20 shows the blank after the end sections have been deflected at right angles to the body of the yoke to form the hood, and Fig. 21 is a perspective view of one end of the yoke in its completed form.

Figure 1:
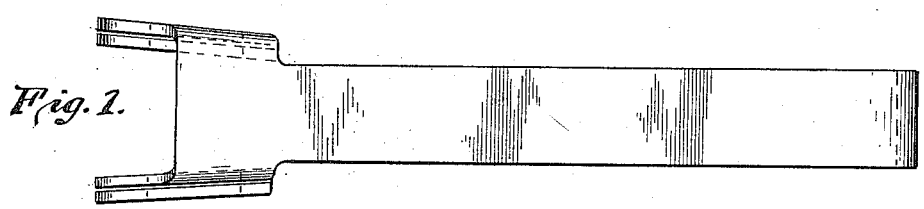
Figure 2:
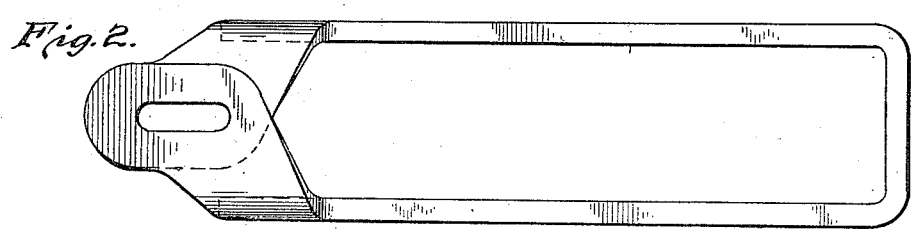
Fig. 2 is a side view of the same.
Figure 3:
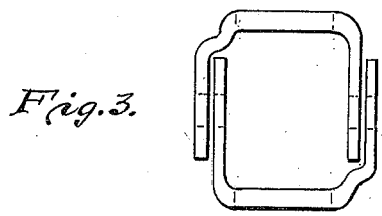
Fig. 3 is an end view.
Figure 4:
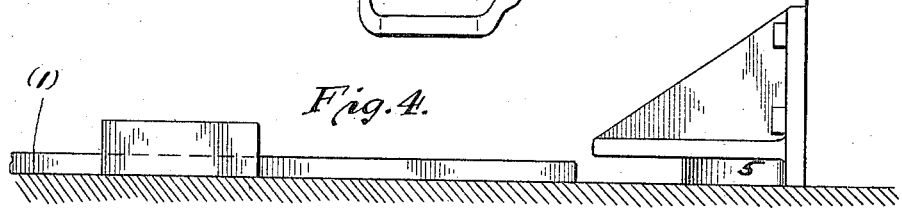
Fig. 4 is a view of a blank of forged steel lying upon the bed of a bulldozer.
Figure 5:
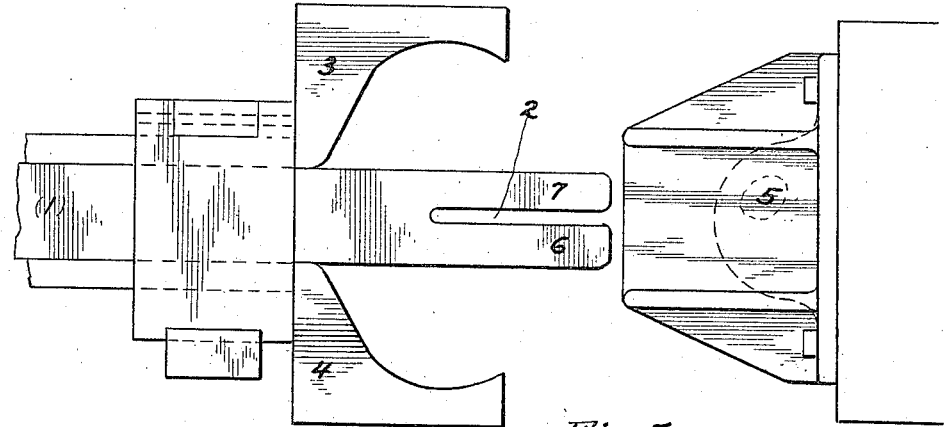
Fig. 5 is a plan view of the structure shown in Fig. 4, both Figs. 4 and 5 showing the blank before it has been acted upon by the dies in the bulldozer.
Figure 6:
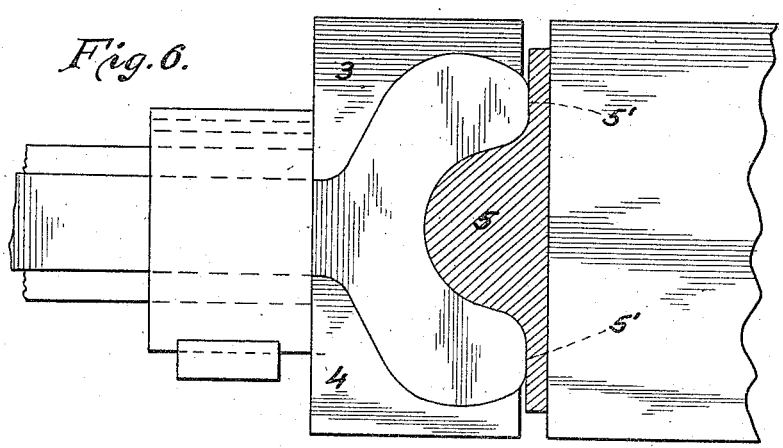
Fig. 6 shows the blank form after it has been formed by the dies in the bulldozer.
Figure 7:
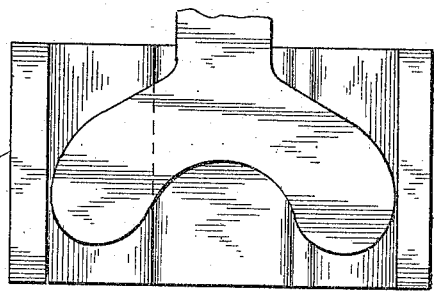
Figs. 7 and 8 are plan and cross-sectional views respectively of the blank as formed at the stage shown in Fig. 6, the blank being shown in its relation to dies designed to bend the separated end portions of the blank to form opposing sides of the hood.
Figure 8:
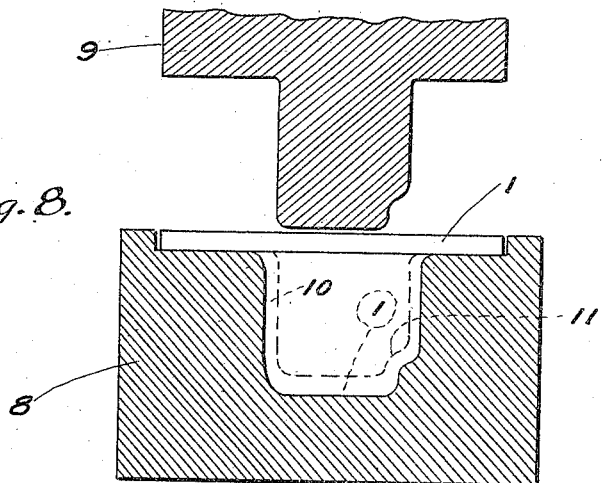

The completed yoke as illustrated in Figs. 1, 2 and 3, and one end thereof in Figs. 20 and 21, consists of a strip of forged steel bent in to the form of an open rectangle to embrace the draft rigging and having its ends deflected and provided with key openings to embrace and be secured to the end of the draw-bar. While in describing the process of making my improved yoke I will refer to the different steps as performed in a certain sequence, it will, of course, be obvious that the process is not restricted to the precise order of steps referred to in the description, but that some of the steps may be performed in a different sequence without departing from my invention. As illustrated, the first step is the cutting of a substantially rectangular strip of forged steel of such cross-sectional area as to provide the necessary strength, this blank being cut without providing any superfluous metal to compensate for rivet or key openings. The ends of the blank 1 are then cut inwardly from the ends, as indicated at 2, no more metal being removed in making this cut than necessary. As illustrated in Figs. 4 to 6 inclusive, the forged steel blank, previously bifurcated at the end as described, is placed in a bulldozer provided with dies 3 and 4 forming the female part of the forming mechanism, and the die 5 constituting the coöperating part. The dies 3 and 4 are shaped to give the necessary exterior contour and the die 5 to give the requisite interior contour to the blank in order to prepare it for the subsequent bending of the bifurcated ends at right angles to form the completed hood. The effect of the die 5 is to spread the bifurcated ends 6 and 7 of the blank and in conjunction with the dies 3 and 4 to impart to these ends the form appearing in Figs. 6 and 7. As the dies come together the part 5' of the male die may operate by direct pressure, if desired, to upset the bifurcated ends of the blank, thereby increasing the thickness thereof to compensate for the key openings formed therein. Up to this point the bifurcated ends of the blank have been spread, and thickened by upsetting, if necessary, but the metal still lies in the plane of the original blank. In following the procedure now being described, the bending of the bifurcated ends at right angles to form the opposing sides of the hood is performed as a distinct operation by means of the dies shown in Figs. 7 and 8, which dies may be operated in a press. In Fig. 7 I have shown the blank with the ends formed as above described, lying upon a female die 8, and in Fig. 8 I show the die 8 and the coacting male die 9 in cross-section with the previously formed blank 1 between them. The die 8 is provided with a cavity for the forming of the hood end of the completed yoke and the die 9 is of corresponding form and designed by pressure to transform the blank 1 from the form shown in solid lines in Fig. 8, to that indicated in dotted lines. One side of the dies 8 and 9 is straight, as indicated at 10, and the other side is provided with an offset 11, the offset 11 providing for the overlapping of the hood members on opposite ends of the yoke, as more particularly indicated in Fig. 3, but also shown in Figs. 1 and 2. The key openings in the hood of the yoke may be formed at any convenient stage of the operation, preferably after the yoke has been given its completed form. In Figs. 9 to 14 inclusive, I have shown a modified method of forming the hoods at the ends of the yoke, the forming in this instance being accomplished in a single operation. In this method of procedure, as in the preceding method, the ends of the blank of which the yoke is to be formed are first cut inwardly from the end. The blank is then placed upon a die of the form shown in Fig. 9. In this method of procedure the bifurcated ends of the blank are spread, that is, separated from one another and deflected at a right angle to the body of the yoke in a single operation. Upon reference to Fig. 13 the nature of this operation will be clearly apparent. In Fig. 9 the bifurcated ends of the blank are indicated by the numerals 6 and 7, the blank being as yet unacted upon by the dies. The die 15 is provided with a cavity of the form of one part of the yoke hood. The coacting die 16 is provided with a central part 17 projecting from the body thereof and designed to spread the bifurcated ends 6 and 7 of the blank. As the ends 6 and 7 are spread by the part 17 of the male die they are deflected into the parts 18 and 19 of the female die, thus assuming a position at right angles to the body of the yoke. The wings 20 and 21 of the male die come into play after the bifurcated ends of the blank have been spread and deflected into the cavities 18 and 19 and have the effect of imposing pressure upon the ends of the bifurcated hood sections, thereby additionally serving to conform the metal to the spaces 18 and 19 in the female die.

In Figs. 15 to 21 I have shown still another series of operations whereby my improved process may be applied. Having a blank of the form shown in Fig. 15 the end thereof is subjected to longitudinal pressure with the effect of widening it, after which the widened portion may be reduced in thickness, as shown in Fig. 16. The next step, shown in Fig. 17, is that of cutting the end of the blank inwardly after which the ends are spread and formed by suitable dies in a bulldozer or otherwise, as shown in Fig. 18. Following this operation the diverging bifurcated ends of the blank are brought by dies into substantial parallelism with the axis of the yoke, as shown in Fig. 19 and then the ends so formed are turned at right angles to the plane of the body of the yoke, thus forming the completed hood sections as shown in Figs. 20 and 21.

Instead of proceeding as described in the several modifications of my process above referred to, the forming of the yoke up to the point illustrated in Figs. 15 and 16 of the drawing may be accomplished by using a forged steel blank initially having the width of the widened part shown in Fig. 16, the blank being considerably shorter than the length of the yoke from end to end. This blank can then be drawn down in its central portion to the width and thickness necessary in the part of the yoke which surrounds the draft rigging, leaving the ends in their initial form. The widened end portions may then be thinned out to the desired section, these operations resulting in forming the yoke up to the stake illustrated in Figs. 15 and 16, after which the procedure may be as described in connection with other modifications of the process hereinbefore referred to.

What I claim is:

1. A process of constructing an integral hooded coupler yoke from an elongated blank of forged steel comprising the operations of cutting said blank inwardly from each end upon the longitudinal center thereof to form hood sections, spreading said sections outwardly from the longitudinal axis of said blank, deflecting the end parts of said sections into substantial parallelism with said axis, bending said sections through substantially ninety degrees upon lines parallel to said axis and forming key openings near the ends of said sections.

2. A process of constructing an integral hooded coupler yoke from an elongated substantially rectangular blank of forged steel comprising the operations of cutting an elongated substantially rectangular blank having a cross-sectional area not substantially greater than necessary for the tensile stresses upon the completed yoke, cutting said blank inwardly from each end upon the longitudinal center thereof to form hood sections, spreading said sections outwardly from the longitudinal axis of said blank, deflecting the end parts of said sections into substantial parallelism with said axis, bending said sections through substantially ninety degrees upon lines parallel to said axis and forming key openings near the ends of said sections.

3. A process of constructing an integral hooded coupler yoke from an elongated substantially rectangular blank of forged steel comprising the operations of cutting said blank inwardly from each end upon the longitudinal center thereof to form hood sections, upsetting and spreading said sections in the plane of the blank outwardly from the longitudinal axis thereof and forming the ends of said sections into substantial parallelism with said axis, bending said sections through substantially ninety degrees upon lines parallel to said axis, upsetting the end parts of said sections to increase the cross-section thereof, and forming key openings near the ends of said sections.

4. A coupler yoke consisting of an integral piece of forged steel having approximately the form of an open rectangle to surround the draft rigging, the ends of the yoke being bifurcated, the bifurcated ends being widened and extending at right angles to the body of the yoke and overlapped but free from permanent connection with each other to form a hood to embrace the drawbar.

5. A coupler yoke consisting of an integral piece of forged steel having approximately the form of an open rectangle to surround the draft rigging, the ends of the yoke being bifurcated, the bifurcated ends being widened and extending at right angles to the body of the yoke and overlapped but free from permanent connection with each other to form a hood to embrace the drawbar, said hood being provided with key openings to receive a key adapted to also extend through the key opening of a drawbar.

In testimony whereof, I have subscribed my name.

JOHN W. DALMAN.

Copies of this patent may be obtained for five cents each, by addressing the "Commissioner of Patents, Washington, D. C."